United States Patent

Mitomo et al.

[11] Patent Number: 5,591,685
[45] Date of Patent: Jan. 7, 1997

[54] SUPERPLASTIC SILICON CARBIDE SINTERED BODY

[75] Inventors: Mamoru Mitomo, Ushiku; Hideki Hirotsuru, Tokyo, both of Japan; Youngwook Kim, Seoul, Rep. of Korea

[73] Assignee: National Institute for Research in Inorganic Materials, Tsukuba, Japan

[21] Appl. No.: 539,337

[22] Filed: Oct. 4, 1995

[30] Foreign Application Priority Data

Mar. 3, 1995 [JP] Japan ................. 7-070609

[51] Int. Cl.$^6$ ................. C04B 35/569
[52] U.S. Cl. ................. 501/88; 501/89
[58] Field of Search ................. 501/88, 89

[56] References Cited

U.S. PATENT DOCUMENTS

| | | | |
|---|---|---|---|
| 4,502,983 | 3/1985 | Omori et al. | 501/89 |
| 4,829,027 | 5/1989 | Cutler et al. | 501/89 |
| 4,876,226 | 10/1989 | Fuentes | 501/89 |
| 5,236,875 | 8/1993 | Trigg et al. | 501/89 |
| 5,281,564 | 1/1994 | Matsumoto | 501/89 |
| 5,298,470 | 3/1994 | Chia et al. | 501/89 |

*Primary Examiner*—Karl Group
*Attorney, Agent, or Firm*—Oblon, Spivak, McClelland, Maier & Neustadt, P.C.

[57] ABSTRACT

A superplastic silicon carbide sintered body which comprises at least 85 wt % and at most 98 wt % of silicon carbide grains and more than 2 wt % and less than 15 wt % of a grain boundary phase and which has a relative density of at least 95%, wherein the silicon carbide grains have an average grain size of at most 0.3 µm, the amount of grains having grain sizes exceeding 0.5 µm is at most 3 wt %, and the deformation rate of the sintered body is at least $10^{-4}$/sec under a compression or tensile stress of from 50 to 2,000 kg/cm$^2$ within a temperature range of from 1,600° to 1,800° C.

16 Claims, 1 Drawing Sheet

SUPERPLASTIC SILICON CARBIDE SINTERED BODY

BACKGROUND OF THE INVENTION

1. Field of the Invention

The present invention relates to a superplastic silicon carbide sintered body and a method for its preparation. More particularly, the present invention relates to a sintered body whereby silicon carbide excellent in corrosion resistance and abrasion resistance even at a high temperature, can directly be processed by plastic processing into various shapes, such as chemical plants, pumps for transporting liquids and engine parts, and a method for preparing such a sintered body.

2. Discussion of Background

Ceramics have excellent properties such as high strength and high hardness at both low and high temperatures, as compared with organic polymer or metallic materials, and their application has been expanded to parts such as structural materials to be used at low or high temperatures. Especially, silicon carbide ceramics have been developed for practical application as corrosion and abrasion resistant mechanical parts to be used under severe conditions. However, ceramics materials including silicon carbide ceramics have a problem that it is difficult to process them. Namely, metal materials can readily be molded by rolling or casting and can readily be machine-processed by e.g. cutting or machining, and thus, they have a feature that the processing cost is low. Whereas, ceramics can hardly be processed by bending or cutting, and they are obliged to be processed by grinding or polishing. Therefore, a tool made of diamond is required, whereby the processing cost tends to be extremely high, and such a cost may sometimes amount to more than one half of the price of the parts.

To reduce such processing cost of ceramics, it is necessary to sinter and form parts in a shape as close as possible to their final shape so that the subsequent processing can be minimized. For this purpose, it is desired to prepare ceramics to have super-fine grains, so that their superplasticity can be utilized. Here, the superplasticity usually means a nature such that superfine crystal grains of metal readily undergo plastic deformation under an external stress at a high temperature. By utilizing this superplasticity, it is possible to readily produce various products ranging from materials having simple shapes to parts having complicated shapes. Accordingly, if such superplasticity can be utilized also with respect to ceramics, parts as final products can be prepared by the same means as in the case of metals, whereby the processing cost can substantially be reduced. From such a viewpoint, a study has been made for near-net shaping to obtain a desired shape by utilizing the superplasticity also in the case of ceramics.

Heretofore, it has been known that super-fine grains of zirconia, mullite and apatite among oxide ceramics exhibit superplasticity, and development has been made for practically useful parts utilizing the superplasticity.

Further, the present inventors have previously found that when silicon nitride of a fine grain size is sintered at low temperature, it can be sintered while the grains are maintained to be fine and uniform, and on the basis of this discovery, they have developed a sintering method for superplastic silicon nitride. However, in the case of silicon carbide, a high density sintered body cannot be obtained unless it is sintered at a temperature higher by 200° C. than silicon nitride, and if it is sintered at such a high temperature, grain growth of silicon carbide will take place, and the average particle size will be at lest 2 μm, thus leading to a difficulty that such a product will not be deformed at a temperature lower than the sintering temperature. The only report is that silicon carbide shows a deformation of about 40% at 1,900° C. (C. Carry and A. Mocollin. Mater. Res. Soc. Vol. 18. p. 391 (1984)). However, this temperature is substantially the same as the sintering temperature of silicon carbide. The deformation rate is usually highly sensitive to the temperature, and most materials tend to readily deform when the temperature becomes close to their sintering temperatures. Therefore, this report is not related to plastic deformation at a temperature lower than the sintering temperature. Superplasticity is significant technically as well as academically when deformation is shown at a temperature substantially lower than the sintering temperature. From this viewpoint, a superplastic silicon carbide sintered body has not yet been developed by the study so far made. Silicon carbide is expected to be useful as a material which has high hardness and which exhibits excellent corrosion resistance and abrasion resistance even under severe conditions at low or high temperatures. Therefore, it has been very much desired to realize a new technology whereby such silicon carbide can be subjected to plastic deformation and can be made into shapes close to the final shapes of various parts having complicated shapes, so that post processing such as grinding can be minimized to produce the final products at low cost.

SUMMARY OF THE INVENTION

Accordingly, the present invention has been made to solve the above described problems of the prior art and to provide a silicon carbide sintered body showing superplasticity and a method for preparing it.

To solve the above problems, the present invention provides:

(I) A superplastic silicon carbide sintered body which comprises at least 85 wt % and at most 98 wt % of silicon carbide grains and more than 2 wt % and less than 15 wt % of a grain boundary phase and which has a relative density of at least 95%, wherein the silicon carbide grains have an average grain size of at most 0.3 μm, the amount of grains having grain sizes exceeding 0.5 μm is at most 3 wt %, and the deformation rate of the sintered body is at least $10^{-4}$/sec under a compression or tensile stress of from 50 to 2,000 kg/cm$^2$ within a temperature range of from 1,600° to 1,800° C.: and (II) A superplastic silicon carbide sintered body which comprises at least 85 wt % and at most 98 wt % of silicon carbide grains and more than 2 wt % and less than 15 wt % of a grain boundary phase and which has a relative density of at least 95%, wherein the silicon carbide grains have an average grain size of at most 0.2 μm, the amount of grains having grain sizes exceeding 0.4 μm is at most 1 wt %, and the deformation rate of the sintered body is at least $10^{-4}$/sec under a compression or tensile stress of from 200 to 1,000 kg/cm$^2$ within a temperature range of from 1,550° to 1,750° C.

In one embodiment, the present invention provides the above superplastic silicon carbide sintered body wherein the grain boundary phase comprises oxides, and it is a glass comprising oxides of Si and at least one member selected from the group consisting of Al rare earth metals and alkaline earth metals.

DETAILED DESCRIPTION OF THE PREFERRED EMBODIMENTS

Now, the invention will be described in further detail. The deformation rate of ceramics at a high temperature depends largely on the grain size of the ceramics and, in particular, is inversely proportional to the two to three power of the average grain size in superplastic deformation. Accordingly, if grain growth takes place during the deformation, the processing resistance will increase, and the deformation rate rapidly decreases. This is a phenomenon so-called work-hardening. If large grains are present in fine grains, they serve as nuclei for grain growth, and some grains will grow during the processing, thus leading to work-hardening. Under these circumstances, the present inventors have conducted extensive studies and as a result, have found that in order to obtain ceramics which can be processed by superplastic deformation, it is necessary not only that the average grain size is small but to use the material having a uniform microstructure containing no large grains which serve as nuclei for grain growth. They have reached a conclusion that the reason why a superplastic silicon carbide sintered body has not yet been obtained as described above, is that the grain size of the starting material is large, and a high temperature is required for sintering. It has been found that grain growth can be suppressed by adding a sinter-assisting agent for promoting liquid phase sintering to a silicon carbide powder having a small average particle size and a narrow particle size distribution, followed by sintering at a low temperature, to obtain a silicon carbide sintered body showing superplasticity. The present invention has been accomplished on the basis of these discoveries.

Here, the grain boundary phase comprises a sinter-assisting agent and silica present at the surface of silicon carbide. It is considered that by an addition of the sinter-assisting agent, a liquid phase forms during sintering, whereby boundary sliding takes place so that superplastic deformation will result. For this purpose, the grain boundary phase is preferably more than 2 wt % and less than 15 wt %. If it is less than 2 wt %, sintering tends to be difficult and the deformation rate tends to decrease, such being undesirable. On the other hand, if it exceeds 15 wt %, the mechanical properties of the sintered body tend to deteriorate.

The sinter-assisting agent for the grain boundary phase preferably comprises oxides and is preferably a glass comprising oxides of Si and at least one member selected from the group consisting of Al rare earth metals and alkaline earth metals, or such a glass partially containing a crystalline phase, whereby sintering can be conducted at low temperature while suppressing the grain growth, when a silicon carbide powder is subjected to liquid phase sintering.

$Al_2O_3$ is preferred as an oxide of Al; $Y_2O_3$, $Sc_2O_3$, $La_2O_3$, $CeO_2$, $Pr_2O_3$, $Nd_2O_3$, $Sm_2O_3$, $Eu_2O_3$, $Gd_2O_3$, $Tb_2O_3$, $Dy_2O_3$, $Ho_2O_3$, $Er_2O_3$, $Tm_2O_3$, $Yb_2O_3$ and $Lu_2O_3$ are preferred as oxides of rare earth metals; MgO and CaO are preferred as oxides of alkaline earth metals; and $SiO_2$ is preferred as an oxide of Si. $SiO_2$ is necessarily present in the form of an oxide layer at the surface of silicon carbide, but if the amount is inadequate, it may be separately incorporated.

As the glass, a glass comprising $SiO_2$ and at least one member selected from the group consisting of $Al_2O_3$, $Y_2O_3$, MgO and CaO, is preferred.

If the relative density is not at least 95%, densification is likely to take place during the deformation, whereby the objective for near-net shaping can not be accomplished. Further, pores are likely to grow during the deformation, whereby the material may break. Otherwise, residual pores are likely to be a source for breakage. For these reasons, the pores are preferably less than 5%, more preferably less than 2%.

When the average grain size of silicon carbide grains is at most 0.3 μm, and the amount of grains having grain sizes exceeding 0.5 μm is at most 3 wt %, deformation takes place at a deformation rate of at least $10^{-4}$/sec under a compression or tensile stress of from 50 to 2,000 kg/cm$^2$ within a temperature range of from 1,600° to 1,800° C. If the average grain size exceeds 0.3 μm, the rate of plastic deformation tends to be low, such being undesirable. Further, if the amount of grains having grain sizes exceeding 0.5 μm, exceeds 3 wt %, work-hardening tends to occur, such being undesirable.

Here, the deformation rate under the compression or tensile strength is defined to be at least $10^{-4}$/sec (a deformation of at least 36% per hour), because a deformation rate of at least this value is regarded as representing superplasticity.

Plastic processing is usually carried out under a compression or tensile stress of from 50 to 2,000 kg/cm$^2$. If the deformation rate is at least $10^{-4}$/sec, such is a sufficient processing speed for ceramics. Thus, if the processing temperature is within a range of from 1,550° to 1,800° C., the silicon carbide powder of the present invention can be processed by superplastic shaping. At a temperature exceeding 1,800° C., the processing speed will be high, but grain growth will be remarkable, and thermal decomposition from the surface will take place, such being undesirable. On the other hand, at a temperature lower than 1,550° C., an extremely high processing pressure will be required, such being not practical. With the sintered body of the above (I), processing can be carried out at a temperature lower by at least 100° C. than the sintering temperature of 1,900° C. for conventional silicon carbide, and various parts of complicated shapes can thereby be prepared.

In the sintered body of the above (II), silicon carbide grains are very fine. If the average grain size is at most 0.2 μm, and the amount of grains having grain sizes exceeding 0.4 μm is at most 1 wt %, the sintered body undergoes superplastic deformation at a deformation rate of at least $10^{-4}$/sec under a compression or tensile stress of from 50 to 2,000 kg/cm$^2$ within a temperature range of from 1,550° to 1,750° C., whereby processing can be carried out at a temperature further lower by at least 50° C. than the processing temperature for (I), i.e. a temperature lower than at least 150° C. than the sintering temperature of 1,900° C. for conventional silicon carbide.

As an embodiment of the above described finding, the present invention also provides:

(III) A method for preparing a superplastic silicon carbide sintered body, which comprises adding and mixing more than 1.5 wt % and less than 14 wt % of at least one member selected from the group consisting of Al oxides, rare earth metal oxides, alkaline earth metal oxides and $SiO_2$, as a sinter-assisting agent, to at least 86 wt % and at most 98.5 wt % of a fine silicon carbide powder having an average particle size of at most 0.3 μm and a specific surface area of at least 20 m$^2$/g, and then sintering the mixture in a neutral atmosphere such as Ar, He or $N_2$ at a temperature of from 1,500° to 1,950° C. under a pressure of from 100 to 1,000 kg/cm$^2$.

Here, the sinter-assisting agent is composed of oxides and preferably is a glass comprising at least one member selected from the group consisting of Al rare earth metals, alkaline earth metals and Si, or such a glass containing a crystalline phase. Sintering is preferably carried out by hot press sintering or plasma sintering in an argon atmosphere as the neutral atmosphere.

It is particularly preferred to employ a sinter-assisting agent comprising at least one member selected from the group consisting of $Al_2O_3$, $Y_2O_3$, MgO, CaO and $SiO_2$.

The reason for the definition of "at least 86 wt % and at most 98.5 wt % of a fine silicon carbide powder having an average particle size of at most 0.3 µm and a specific surface area of at least 20 $m^2/g$" is that silicon carbide required to obtain a superplastic silicon carbide sintered body, is a fine silicon carbide powder having a small average particle size and a narrow particle size distribution and is required to be sintered at a lower temperature while suppressing grain growth. If the average particle size exceeds 0.3 µm, or if the specific surface area is less than 20 $m^2/g$, or if both of such conditions are met, such a fine silicon carbide powder is not desirable, since there will be nuclei present for grain growth, and the nuclei tend to abnormally grow during heating, whereby sintering can not be accomplished. Therefore, the silicon carbide preferably has an average particle size of from 0.1 to 0.2 µm and a specific surface area of from 25 to 35 $m^2/g$. A silicon carbide powder always contains from 1 to 3 wt % of silica as the surface oxide layer, and such silica reacts with the sinter-assisting agent to form a liquid phase. Further, some free carbon is present in the silicon carbide powder, although the amount varies depending upon the method for its preparation. Such free carbon reacts with components in the liquid phase to lose its amount or to form a compound having a high melting point, such being undesirable. Sintering will be hindered if the amount of free carbon exceeds 2.0 wt %. Therefore, the amount of free carbon is preferably at most 2.0 wt %.

As mentioned above, the sinter-assisting agent is required to be more than 1.5 wt % and less than 14 wt %, in view of the sintering and the superplastic deformation rate.

Sintering is preferably conducted by hot press sintering or plasma sintering. However, any sintering method may be employed so long as the fine silicon carbide powder undergoes plastic deformation under a pressure of from 100 to 1,000 $kg/cm^2$ at a temperature of from 1,500° to 1,950° C. Other than the above-mentioned methods, pressureless sintering or HIP (hot isostatic pressing) may, for example, be employed.

The grain size of the silicon carbide sintered body is determined in such a manner that a sample is cut and polished, and then treated with a microwave plasma of $CF_4$ gas to remove silicon carbide grains so that oxide-type glass of grain boundaries will remain, followed by inspection by a scanning electron microscope (SEM). The average grain size is the one obtained by selecting at least 500 grains from a SEM photograph, calculating the shortest diameters of the grains on the polished surface by image analysis, followed by averaging them.

Figure 1:
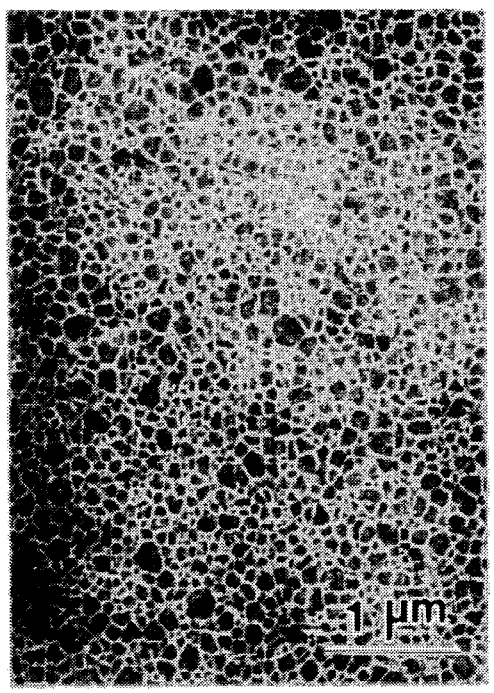
FIG. 1 is a scanning electron microscopic (SEM) photograph of the superplastic silicon carbide sintered body of the present invention obtained in Example 2.

Now, the present invention will be described in further detail with reference to Examples. However, it should be understood that the present invention is by no means restricted by such specific Examples.

EXAMPLE 1

To 10 wt % of commercially available silicon carbide power (Betarundum, manufactured by Ibiden K.K.), 90 wt % of an aqueous solution containing 0.1 wt % of carboxymethyl cellulose (CMC) was added, and the mixture was subjected to wet dispersion and pulverization for 3 hours by a ball mill made of silicon carbide. The obtained slurry was subjected to centrifugal separation for five minutes under a centrifugal force of 1,400 G to separate coarse particles as precipitate. The supernatant slurry was further subjected to centrifugal separation for 90 minutes under a centrifugal force of 2,800 G, and the precipitate was washed and dried to obtain a fine silicon carbide powder. The amount of free carbon was determined from the weight change upon heating the fine powder at 600° C. for 30 minutes in air. As a result, free carbon which was 1.0 wt % in the starting material, increased to 1.6 wt % in the fine powder for sintering. The average particle size of the fine powder was measured by a laser scattering method. The results were as shown in Table 1.

Then, to 90 wt % of this fine silicon carbide powder, 7 wt % of $Al_2O_3$ (AKP 20, manufactured by Sumitomo Chemical Co. Ltd.), 2 wt % of $Y_2O_3$ (fine powder, manufactured by Shin-Etsu Chemical Co. Ltd.) and 1 wt % of CaO (guaranteed reagent, manufactured by Wako Junyaku K.K.) were added and mixed in ethanol for 5 hours in a wet system, followed by drying and pulverization. Then, 4 g of this powder was filled in a 15 mmφ carbon die and subjected to hot press sintering in an argon atmosphere at 1,800° C. under a pressure of 200 $kg/cm^2$ for 15 minutes. With respect to the sintered body thereby obtained, the density of the sintered body was measured by an Archimedes method. Then, the sintered body was cut and polished to a mirror surface. Then, the polished surface was subjected to plasma etching, whereupon the microstructure of the sintered body was inspected by a scanning electron microscope (SEM). Further, the SEM photograph was subjected to evaluation of grains by an image analyzer (Luzex III, manufactured by Nireko Co.). The evaluation was carried out with respect to at least 500 grains, and the average grain size and the proportion by wt % of the amount of grains having grain sizes of at least 0.5 µm to the entire particles, were calculated. The results were as shown in Table 2.

As shown in Table 2, this sintered body was sufficiently densified even by the sintering at a low temperature of 1,800° C., and the microstructure of the sintered body was a very fine and uniform microstructure containing no coarse grains. The average grain size obtained by the measurement of the grain size distribution is larger than the average grain size obtained by the image analysis. Grains necessarily grow on average during the sintering, and the reason why average grain size of starting powder is larger than that in the sintered body, as shown by this result, is that the measurement of the grain size distribution is by weight average, while the image analysis is by number average.

Then, this sintered body was processed by grinding to a shape of 5 mmφ×7 mm, and evaluation of the high temperature creep was carried out under compression under the temperature and pressure conditions as identified in Table 3. This sintered body showed a superplastic phenomenon with a deformation rate of $2.1 \times 10^{-4}/sec$. With this sintered body, no formation of cracks or the like was observed even after the evaluation of the high temperature creep.

EXAMPLE 2

To 5 wt % of commercially available super-fine silicon carbide powder (β-SiC super-fine powder, manufactured by Sumitomo Cement Co. Ltd.), 95 wt % of an aqueous solution containing 0.1 wt % of CMC was added, and the mixture was dispersed and pulverized in a wet system for 3 hours by a ball mill made of silicon carbide. Then, the obtained slurry was subjected to centrifugal separation for 90 minutes under a centrifugal force of 2,800 G, and after removing free carbon as the supernatant, the precipitate was washed and dried to obtain super-fine silicon carbide powder. Here, the amount of oxygen, the amount of free carbon and the specific surface area were calculated in the same manner as in Example 1. In this Example, it was difficult to measure the particle sizes by the laser scattering method as used in Example 1, and therefore, the average particle size was calculated from the specific surface area measured by nitrogen adsorption method on the assumption that the particles were spherical. The results were as shown in Table 1.

Then, to 90 wt % of this super-fine silicon carbide powder, the same $Al_2O_3$, $Y_2O_3$ and CaO as used in Example 1, were added in the same wt % as in Example 1, respectively, and the mixture was mixed in ethanol in a wet system for 5 hours, followed drying and pulverization. Then, 4 g of this powder was filed in a 15 mmφ carbon die and subjected to hot press sintering for 15 minutes in an argon atmosphere at 1,750° C. under a pressing pressure of 200 kg/cm$^2$. With respect to the obtained sintered body, the measurement of the density of the sintered body, the inspection of the microstructure of the sintered body by SEM, and the image analysis of the SEM photograph were carried out in the same manner as in Example 1. The results were as shown in Table 2.

As shown in Table 2, this sintered body was sufficiently densified in spite of the fact that the sintering temperature was 1,750° C. which was further lower by 50° C. than in Example 1, and the microstructure of the sintered body was a very fine and uniform microstructure containing no coarse grains of 0.5 μm or larger. FIG. 1 shows the SEM photograph. This shows that the microstructure of the sintered body is very fine and uniform.

Then, this sintered body was processed by grinding to a shape of 5 mmφ×7 mm in the same manner as in Example 1, and evaluation of the high temperature creep was carried out under compression under the temperature and pressure conditions as shown in Table 3. This sintered body showed a superplastic phenomenon with a deformation rate of $1.8×10^{-4}$/sec. Also with this sintered body, no formation of cracks or the like was observed even after the evaluation of the high temperature creep.

COMPARATIVE EXAMPLE 1

Using as-received silicon carbide powder as used in Example 1, the amount of oxygen, the amount of free carbon, the specific surface area and the particle size distribution of this silicon carbide powder were measured and calculated in the same manner as in Example 1. The results were as shown in Table 1.

Figure 2:
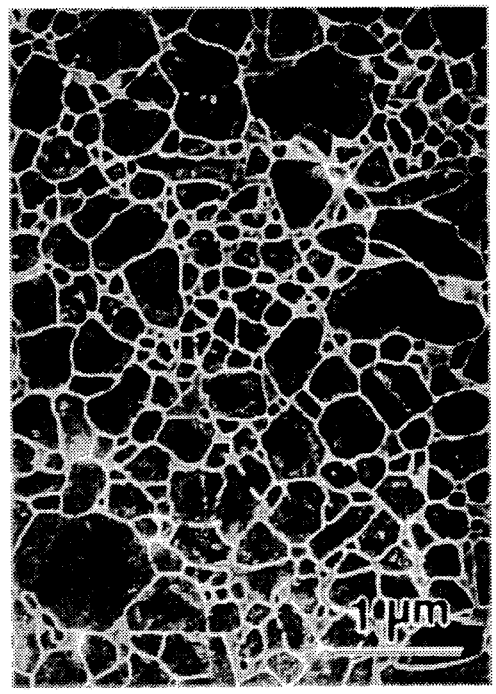
FIG. 2 is a scanning electron microscopic (SEM) photograph of the silicon carbide sintered body obtained in Comparative Example 1.

Then, to 90 wt % of this silicon carbide powder, the same $Al_2O_3$, $Y_2P_3$ and CaO as used in Example 1 were added in the same wt % as in Example 1, respectively, and the mixture was mixed in ethanol in a wet system for 5 hours, followed drying and pulverization. Then, 4 g of this powder was filled in a 15 mmφ carbon die and subjected to hot press sintering for 15 minutes in an argon atmosphere, at 1,900° C. under a pressing pressure of 200 kg/cm$^2$. With respect to the obtained sintered body, the measurement of the density of the sintered body, the inspection of the microstructure of the sintered body by SEM and the image analysis of the SEM photograph were carried out in the same manner as in Example 1. The results were as shown in Table 2. The average grain size was 0.23 μm, but grains having grain sizes of 0.5 μm or larger were contained as much as 30.1 vol %. This indicates that grain growth took place. FIG. 2 shows the SEM photograph. This photograph shows that the microstructure of this sintered body is coarse, and the grain sizes are non-uniform, thus indicating the grain growth by sintering.

Then, this sintered body was processed by grinding to a shape of 5 mmφ×7 mm in the same manner as in Example 1, and evaluation of the high temperature creep was carried out under compression under the temperature and pressure conditions as identified in Table 3. The result of the deformation rate was as shown in Table 3 and did not show superplasticity, and the deformation rate was two order of magnitude lower than those in Examples 1 and 2 even at a creep test temperature of 1,700° C. which is higher than in Examples 1 and 2.

COMPARATIVE EXAMPLE 2

Using as-received super-fine silicon carbide powder as used in Example 2, the amount of oxygen, the amount of free carbon and the specific surface area of this superfine silicon carbide powder were measured and calculated in the same manner as in Example 1. In Comparative Example 2, it was difficult to measure the particle sizes by the laser scattering method as used in Example 1, and therefore in the same manner as in Example 2, the average particle size was calculated from the specific surface area on the assumption that the particles were spherical. The results were as shown in Table 1.

Then, to 90 wt % of this super-fine silicon carbide powder, the same $Al_2O_3$, $Y_2O_3$ and CaO as used in Example 1 were added in the same wt % as in Example 1, respectively, and the mixture was mixed in ethanol in a wet system for 5 hours, followed by drying and pulverization. Then, 4 g of this powder was filled into a 15 mmφ carbon die and subjected to hot press sintering for 15 minutes in an argon atmosphere at 1,850° C. under a pressing pressure of 200 kg/cm$^2$. With respect to the obtained sintered body, the measurement of the density of the sintered body, the inspection of the microstructure of the sintered body by SEM and the image analysis of the SEM photograph were carried out in the same manner as in Example 1. The results were as shown in Table 2 and indicated that grain growth took place.

Then, this sintered body was processed by grinding to a shape of 5 mmφ×7 mm in the same manner as in Example 1, and evaluation of the high temperature creep was carried out in an argon atmosphere under compression under the temperature and pressure conditions as identified in Table 3. The result of the deformation rate did not show superplasticity as shown in Table 3.

TABLE 1

| Test No. | Classifying treatment | Amount of oxygen (wt %) | Amount of free carbon (wt %) | Specific surface area (m$^2$/g) | Average Particle size (μm) |
|---|---|---|---|---|---|
| Example 1 | Yes | 1.6 | 1.6 | 22.2 | 0.38 |
| Example 2 | Yes | 1.0 | 1.9 | 21.4 | 0.09 |
| Comparative Example 1 | No | 1.1 | 1.0 | 18.2 | 0.55 |
| Comparative Example 2 | No | 0.9 | 4.2 | 46.8 | 0.04 |

TABLE 2

| Test No. | Sintering Temp. (°C.) | Relative density (%) | Results of image analysis | |
|---|---|---|---|---|
| | | | Average grain size (μm) | Amount of grains of ≧ 0.5 μm (wt %) |
| Example 1 | 1800 | 95.5 | 0.13 | 1.8 |
| Example 2 | 1750 | 95.6 | 0.09 | 0 |
| Comparative Example 1 | 1900 | 98.9 | 0.23 | 30.1 |
| Comparative Example 2 | 1850 | 92.4 | 0.21 | 18.6 |

TABLE 3

| Test No. | Conditions for evaluation | | Deformation rate (/sec) |
|---|---|---|---|
| | Temp. (°C.) | Stress (kg/cm²) | |
| Example 1 | 1650 | 500 | $2.1 \times 10^{-4}$ |
| Example 2 | 1600 | 1000 | $1.8 \times 10^{-4}$ |
| Comparative Example 1 | 1700 | 1000 | $2.5 \times 10^{-6}$ |
| Comparative Example 2 | 1700 | 1000 | $4.5 \times 10^{-6}$ |

EXAMPLE 3

Using processed super-fine silicon carbide powder as used in Example 2, to 90 wt % of the super-fine silicon carbide powder, the same $Al_2O_3$, $Y_2O_3$ and CaO as used in Example 1 were added in the same wt % as in Example 1, respectively, and the mixture was mixed in ethanol in a wet system for 5 hours, followed by drying and pulverization. 4 g of this powder was molded under a pressure of 100 kg/cm² and then shaped by isostatic pressing (CIP) under a pressure of 3 tons/cm². The obtained CIP shaped product was packed together with a covering powder comprising SiC and $Al_2O_3$ in a carbon crucible coated with BN and subjected to pressureless sintering in an argon atmosphere at 1,800° C. for one hour. With respect to the obtained sintered body, the measurement of the density of the sintered body, the inspection of the microstructure of the sintered body by SEM and the image analysis of the SEM photograph was carried out in the same manner as in Example 1.

Then, this sintered body was processed by grinding to a shape of 5 mmφ×7 mm in the same manner as in Example 1, and evaluation of the high temperature creep was carried out in an argon atmosphere under compression at a temperature of 1,700° C. under a pressure of 500 kg/cm². The results were as shown in Table 4. This sintered body also had a fine and uniform microstructure and exhibited a superplastic phenomenon with a deformation rate of $2.7 \times 10^{-4}$/sec.

COMPARATIVE EXAMPLE 3

Using the silicon carbide powder as used in Comparative Example 1, to 90 wt % of the silicon carbide powder, the same $Al_2O_3$, $Y_2O_3$ and CaO as used in Example 1 were added in the same wt % as in Example 1, respectively, and the mixture was mixed in ethanol in a wet system for 5 hours, followed by drying and pulverization. Then, in the same manner as in Example 3, 4 g of this powder was molded under a pressure of 100 kg/cm² and then shaped by isostatic pressing (CIP) under a pressure of 3 tons/cm². The obtained CIP shaped product was filled together with a covering powder comprising SiC and $Al_2O_3$ in a carbon crucible coated with BN and subjected to pressureless sintering in an argon atmosphere at 1,900° C. for one hour. With respect to the obtained sintered body, the measurement of the density of the sintered body, the inspection of the microstructure of the sintered body by SEM and the image analysis of the SEM photograph were carried out in the same manner as in Example 1.

Then, this sintered body was processed by grinding to a shape of 5 mmφ×7 mm in the same manner as in Example 1, and evaluation of the high temperature creep was carried out in an argon atmosphere under compression at 1,700° C. under a pressure of 500 kg/cm². The results were as shown in Table 4. The sintered body did not show superplasticity.

Also from the results of the foregoing Examples and Comparative Examples, these silicon carbide sintered bodies undergo boundary sliding at high temperatures, whereby plastic deformation results.

TABLE 4

| Test No. | Relative density (%) | Results of image analysis | | Deformation rate (/sec) |
|---|---|---|---|---|
| | | Average grain size (μm) | Amount of grains of ≧ 0.5 μm (wt %) | |
| Example 3 | 97.5 | 0.11 | 0 | $2.7 \times 10^{-4}$ |
| Comparative Example 3 | 96.5 | 0.24 | 32.7 | $1.7 \times 10^{-6}$ |

EXAMPLE 4

Using processed super-fine silicon carbide powder as used in Example 2, to 91 wt % of the super-fine silicon carbide powder, 4 wt % of the same $Al_2O_3$ as used in Example 1 and 2.5 wt % of each of high purity MgO and $SiO_2$ were added, and the mixture was mixed in the same manner as in Example 1. This mixture was dried, and then about 16 g of the dried mixture was put into a graphite mold having a diameter of 20 mm coated with BN powder and heated under a pressure of 500 kg/cm² by a discharge plasma furnace (manufactured by Sumitomo Sekitan Kogyo K.K.). The atmosphere was under a reduced pressure of $3 \times 10^{-3}$ Torr, and the temperature was rapidly raised at a rate of 300° C./min and maintained at 1,700° C. for 5 minutes. The relative density of the sintered body was 96.1% and the average grain size was 0.06 μm. A sample of 5×5 mm with a length of 15 mm was cut out from the sintered body and subjected to a compression test in an argon atmosphere at 1,700° C. under a pressure of 500 kg/m². As a result, the sintered body showed a value within a superplastic region with a deformation rate of $6.2 \times 10^{-4}$/sec.

As described in detail in the foregoing, according to the present invention, a silicon carbide sintered body will be provided which shows superplasticity with a deformation rate of at least $10^{-4}$/sec under a compression or tensile stress of from 50 to 2,000 kg/cm² within a temperature range of from 1,550° to 1,800° C. which is lower than the sintering temperature of conventional silicon carbide. As a result, various parts of complicated shapes using a silicon carbide sintered body, which used to be difficult to process, can readily be prepared at low cost in a state close to the final shapes of such parts, by utilizing the superplasticity. Accordingly, the time required for the preparation of such various parts can be shortened.

What is claimed is:

1. A superplastic silicon carbide sintered body which comprises at least 85 wt % and at most 98 wt % of silicon carbide grains and more than 2 wt % and less than 15 wt % of a grain boundary phase and which has a relative density of at least 95%, wherein the silicon carbide grains have an average grain size of at most 0.3 μm, the amount of grains having grain sizes exceeding 0.5 μm is at most 3 wt %, and the deformation rate of the sintered body is at least $10^{-4}$/sec under a compression or tensile stress of from 50 to 2,000 kg/cm$^2$ within a temperature range of from 1,600 to 1,800° C.

2. A superplastic silicon carbide sintered body which comprises at least 85 wt % and at most 98 wt % of silicon carbide grains and more than 2 wt % and less than 15 wt % of a grain boundary phase and which has a relative density of at least 95%, wherein the silicon carbide grains have an average grain size of at most 0.2 μm, the amount of grains having grain sizes exceeding 0.4 μm is at most 1 wt %, and the deformation rate of the sintered body is at least $10^{-4}$/sec under a compression or tensile stress of from 200 to 1,000 kg/cm$^2$ within a temperature range of from 1,550° to 1,750° C.

3. The superplastic silicon carbide sintered body according to claim 1, wherein the grain boundary phase comprises oxides and is a glass, or a glass containing a crystalline phase, comprising oxides of Si and at least one element selected from the group consisting of Al rare earth metals and alkaline earth metals.

4. The superplastic silicon carbide sintered body according to claim 2, wherein the grain boundary phase comprises oxides and is a glass, or a glass containing a crystalline phase, comprising oxides of Si and at least one element selected from the group consisting of Al rare earth metals and alkaline earth metals.

5. The superplastic silicon carbide sintered body according to claim 3, wherein the glass comprises $SiO_2$ and at least one member selected from the group consisting of $Al_2O_3$, $Y_2O_3$, MgO and CaO.

6. The superplastic silicon carbide sintered body according to claim 4, wherein the glass comprises $SiO_2$ and at least one member selected from the group consisting of $Al_2O_3$, $Y_2O_3$, MgO and CaO.

7. The superplastic silicon carbide sintered body of claim 1, wherein said sintered body is made from a powder comprising silicon carbide powder having an average particle size of at most 0.3 μm.

8. The superplastic silicon carbide sintered body of claim 2, wherein said sintered body is made from a powder comprising silicon carbide powder having an average particle size of at most 0.3 μm.

9. The superplastic silicon carbide sintered body of claim 1, wherein said sintered body is made from a powder comprising silicon carbide powder having a specific surface area of at least 20 m$^2$/g.

10. The superplastic silicon carbide sintered body of claim 2, wherein said sintered body is made from a powder comprising silicon carbide powder having a specific surface area of at least 20 m$^2$/g.

11. The superplastic silicon carbide sintered body of claim 1, wherein said sintered body is made from a powder comprising silicon carbide powder having an average particle size of 0.1–0.2 μm.

12. The superplastic silicon carbide sintered body of claim 2, wherein said sintered body is made from a powder comprising silicon carbide powder having an average particle size of 0.1–0.2 μm.

13. The superplastic silicon carbide sintered body of claim 1, wherein said sintered body is made from a powder comprising silicon carbide powder having a specific surface area of 25–35 m$^2$/g.

14. The superplastic silicon carbide sintered body of claim 2, wherein said sintered body is made from a powder comprising silicon carbide powder having a specific surface area of 25–35 m$^2$/g.

15. The superplastic silicon carbide sintered body of claim 1 wherein said sintered body has less than 2% pores.

16. The superplastic silicon carbide sintered body of claim 2, wherein said sintered body has less than 2% pores.

* * * * *